(12) United States Patent
Rainish et al.

(10) Patent No.: US 11,968,029 B2
(45) Date of Patent: Apr. 23, 2024

(54) DEVICE AND A METHOD FOR TRANSMITTING COMMUNICATIONS IN A SATELLITE NETWORK USING BEAM-HOPPING

(71) Applicant: SATIXFY ISRAEL LTD., Rehovot (IL)

(72) Inventors: Doron Rainish, Ramat Gan (IL); Avraham Freedman, Tel Aviv (IL)

(73) Assignee: SATIXFY ISRAEL LTD., Rehovot (IL)

( * ) Notice: Subject to any disclaimer, the term of this patent is extended or adjusted under 35 U.S.C. 154(b) by 368 days.

(21) Appl. No.: 17/421,795

(22) PCT Filed: Jan. 8, 2020

(86) PCT No.: PCT/IL2020/050035
§ 371 (c)(1),
(2) Date: Jul. 9, 2021

(87) PCT Pub. No.: WO2020/144688
PCT Pub. Date: Jul. 16, 2020

(65) Prior Publication Data
US 2022/0094428 A1   Mar. 24, 2022

Related U.S. Application Data

(60) Provisional application No. 62/790,506, filed on Jan. 10, 2019.

(51) Int. Cl.
*H04L 27/26* (2006.01)
*H04B 7/185* (2006.01)
(Continued)

(52) U.S. Cl.
CPC ..... *H04B 7/18515* (2013.01); *H04L 27/2602* (2013.01); *H04W 16/28* (2013.01); *H04W 84/06* (2013.01)

(58) Field of Classification Search
CPC ........... H04W 16/24–32; H04W 84/06; H04B 7/18515; H04L 27/2602
See application file for complete search history.

(56) References Cited

U.S. PATENT DOCUMENTS

2008/0181108 A1   7/2008   Hashmi et al.
2009/0258664 A1 * 10/2009  Huan ..................... H04W 76/28
                                                                  455/522
(Continued)

FOREIGN PATENT DOCUMENTS

| EP | 1398891 A2 | 3/2004 |
| EP | 2055020 B1 | 4/2017 |
| EP | 3 346 619 A1 | 7/2018 |

OTHER PUBLICATIONS

Arapoglou PD, Ginesi A, Cioni S, Erl S, Clazzer F, Andrenacci S, Vanelli, Coralli A. DVB S2X enabled precoding for high throughput satellite systems. International Journal of Satellite Communications and Networking. May 2016;34(3):439-55, Best Available Date: Apr. 13, 2015 from arxiv.org/abs/1504.03109.

*Primary Examiner* — San Htun
(74) *Attorney, Agent, or Firm* — Browdy and Neimark, PLLC

(57) ABSTRACT

A transceiver is provided which is configured to be used in a satellite communications network and adapted to superframes having variable lengths, wherein at least one of the received superframes has standard payload capacity units (P) and known symbols (D).

20 Claims, 1 Drawing Sheet

(51) Int. Cl.
*H04W 16/28* (2009.01)
*H04W 84/06* (2009.01)

(56) References Cited

U.S. PATENT DOCUMENTS

| | | |
|---|---|---|
| 2012/0294230 A1 | 11/2012 | Dankberg et al. |
| 2016/0352415 A1 | 12/2016 | Subramaniam et al. |
| 2017/0085411 A1* | 3/2017 | Noerpel ............. H04B 7/18504 |
| 2017/0141906 A1* | 5/2017 | Rainish ................ H04B 7/1851 |
| 2019/0349073 A1* | 11/2019 | Regunathan ......... H04B 7/2041 |
| 2021/0297148 A1* | 9/2021 | De Bie .............. H04B 7/18591 |

* cited by examiner

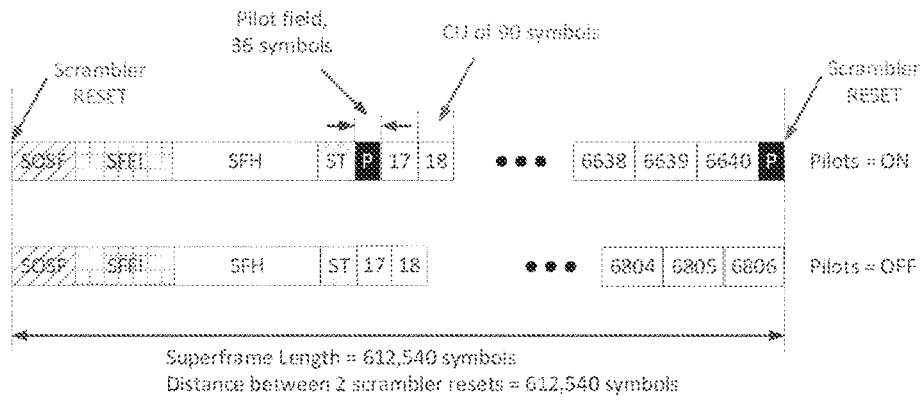
FIG. 1 – PRIOR ART
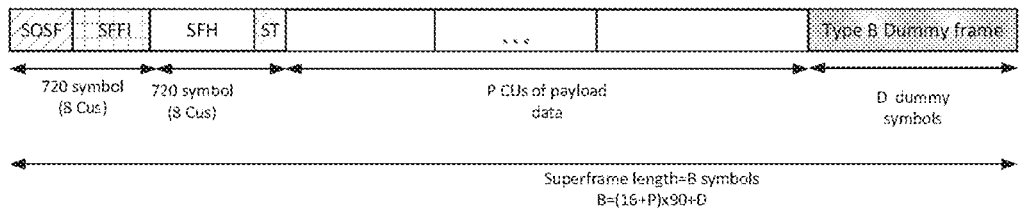
FIG. 2
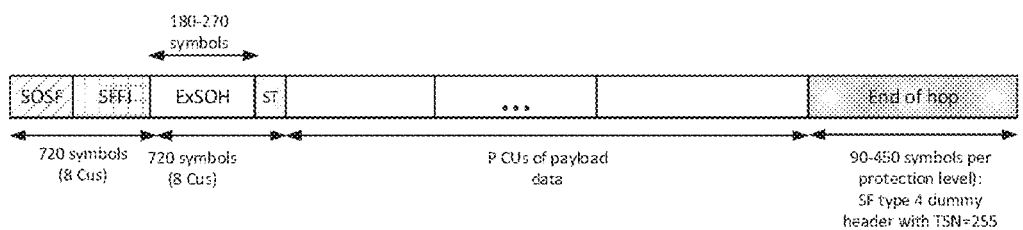
FIG. 3

DEVICE AND A METHOD FOR TRANSMITTING COMMUNICATIONS IN A SATELLITE NETWORK USING BEAM-HOPPING

FIELD OF THE DISCLOSURE

The present disclosure relates to the field of communications and in particularly to communications exchanged between satellite and terrestrial communication terminals/gateways.

BACKGROUND OF THE DISCLOSURE

The introduction of high throughput satellites ("HTS"), having multi-spot beams, provides a significant increase in available satellite throughput. Still, at the same time this type of satellites brings about new challenges in optimally utilizing the satellite bandwidth, beam and power resources in cases of varying demand between beams, non-uniform traffic patterns during the day (peak hours) and the effect of multiple time zones, in traffic load distribution. Current and future satellites introduce flexible techniques, such as flexible power allocation, flexible bandwidth allocation and/or beam hopping to cope with those challenges.

Together with the HTS, new low earth orbit ("LEO") and medium earth orbit ("MEO") constellations are being discussed and introduced in the satellite market. For these types of satellites (as well as the HTS), flexibility may be a key feature to enable cost-effective provisioning of services to areas in which the bandwidth demand is characterized as a variable bandwidth demand.

One way of addressing these challenges is the implementation of a Beam Hopping (BH) transmission scheme. BH, as one of the most flexible techniques, is a technique in which the satellite resource—the transmission beam—is shared in time among different users. Unlike a conventional TDM scheme, transmission takes place within a directional beam pointing at the destination, either as a mechanism for switching the transmission to a given beam within a bank of fixed multi-spot beams, or by means of a fast-steerable antenna. Obviously, several such transmitters can be installed in a single satellite.

In order to get some practical, order-of-magnitude numbers, one can refer to the DVB-S2X standard (ETSI EN 302 307-2) guideline for the implementation of the DVB-S2X standard (ETSI TR 102 376-2), including the use of superframes for beam-hopping. This document refers to the advantages of using beam hopping technique in the following way:

Lower DC power consumption (<50%)
Capacity increase by +15%
Reduction of the unmet and excess capacity by 20%
Better flexibility in allocating capacity to the beams with high traffic demand.

The signal transmitted by the satellite should have the following characteristics in order to qualify as a beam-hopping transmission signal:

It should provide means for fast acquisition by a terminal which was not previously illuminated;
Allocate time for beam switching;
Provide predictability to alleviate terminal synchronization and allow power saving;
Allow fast revisit time to reduce latency;
Enable high dynamic range of dwell times;
Avoid loss of utilization due to framing;
Allow easy modification of beam hopping time plan;
Enable operation in in a variety of operational scenarios, in respect to SNR, bandwidth, and multi-carrier operation;
Exhibit compatibility with advanced techniques in a multi-beam environment (adjacent beam interference mitigation, precoding, etc.); and
Enable satellite to gateway synchronization.

The DVB-S2X standard offers a variety of waveforms, but unfortunately none of them has all the required features described above.

One can distinguish between regular DVB-S2X frames, and waveforms described in Annex E of the standard, also known as superframes (SF). The latter may be implemented in any one of five different formats. Table 1 presented below, describes the gaps that exist between those waveforms vis-à-vis the required features described above:

| Feature | Regular S2X | Annex E Formats 2,3 | Annex E Format 4 |
|---|---|---|---|
| Means for Acquisition | No | Yes, using SOSF | Yes, using SOSF |
| Beam Switching time | No | Fixed | Variable |
| Predictability | No | Yes | Yes |
| Dwell time range | Large | Limited | Limited |
| Utilization | Low | Low | High |
| Multi carrier | Possible | Challenging | Challenging |
| Multi-beam operation | No | Yes | Yes |
| Sat-GW sync | No | Yes | Yes |

FIG. 1 illustrates a structure of a format 4 DVB-S2X Annex E superframe. It basically comprises 612540 symbols, out of which the first 1440 symbols are used as a header (denoted SOSF, SFFI, SFH and ST). For the rest of the symbols, there are two options: one with pilots that include 6640 Capacity Units (CU) of 90 symbols each, plus pilot blocks of 36 known symbols each spread every 16 CU's. The second option comprises 6806 CU's with no pilot blocks.

The term "CU" as used herein throughout the specification and claims is used to denote Capacity Units, each comprising a pre-defined number of symbols. In one of the examples discussed above, the Capacity Units (CU) comprise 90 symbols each. However, as should be understood by those skilled in the art, a CU may comprise any applicable number of symbols.

The payload symbols are arranged in 90 symbols CU's in order to enable their use while transmitting regular DVB-S2X frames, in which the payload data is arranged in 90 symbols slots as well. This structure enables a flexible allocation of regular DVB-S2/S2X frames (which vary in length between 3000 and 33000 symbols) within a superframe.

The SOSF and SFFI fields are recognizable by the receiver, and together they provide strong means of acquisition, even for operation under a low SNR. The SFH is a header field that contains a pointer which is used to point where the first frame within the superframe, begins. This mechanism allows to split a single frame between two superframes, thereby ensuring a high level of utilization. In case such a frame fragmentation is not required, the frame can either be omitted, replaced by a known set of symbols (thereby making its acquisition more robust), it may be shortened to contain only part of the information, or any combination of the above options.

The standard also defines a variable size postamble structure that, when inserted at the end of a superframe, allows for a transition time, that is a minimal time required for a beam switching and re-acquisition.

In addition, the superframe is also scrambled in its entirety with scrambling sequences, which enable multi-beam operation.

The superframe waveforms, especially those of format 4, possess most of the required features defined above, however the main drawback of this superframe format is its fixed length. The standard defines this length as a length of 612540 symbols. This large number of symbols presents a problem in both aspects of latency and utilization. It may require a long dwell time on a near-empty cell, while allowing for only a relatively short dwell time over densely populated cells, to meet revisit time requirements, while covering all the cells assigned for the transmitter. This problem is even further enhanced, if, from operational point of view, the allocated bandwidth is split between several narrow bandwidth carriers. The minimal dwell time is then determined by the fixed number of symbols multiplied by the symbol time carried by the narrowest bandwidth carrier.

The beam hopping technique can be implemented in different satellite systems while using either one of the following two main schemes:

1. Pre-scheduled beam-hopping time plan, in which the beams illuminate the cells according to a plan pre-defined by the satellite system operator, allocating scheduled illumination dwell time to each cell, typically in a cycle, according to the demand forecast per cell. The beam hopping time plan may be modified, relatively infrequently, based on the variability of traffic demand distribution.
2. Traffic driven illumination, where the cells are illuminated according to the actual requirements derived from traffic arriving for the users in each cell.

Each of these schemes can be made in one of the following two modes:

1. Free running mode
2. Grid-based mode.

When implementing the free running mode, the beam hopping event can occur at any time, whereas when implementing the grid-based mode, the hopping events are anchored to a specific grid in time, namely, to time points which are an integer multiplication by a basic time interval.

Traffic driven illumination has an advantage over the pre-scheduled scheme in terms of latency and utilization. The pre-scheduled scheme provides predictability to the beam hopping pattern. Some level of predictability is also provided by a traffic driven illumination in a grid-based mode.

SUMMARY OF THE DISCLOSURE

The disclosure may be summarized by referring to the appended claims.

It is an object of the present disclosure to provide novel mechanisms which can be added to regular and superframe structures defined by of the DVB-S2X standard, to enable improving the performance of systems implementing this standard.

It is another object of the present disclosure to provide a method for providing a flexible variable length to regular and superframe structures defined by of the DVB-S2X standard.

Other objects of the present invention will become more apparent from the following detailed description of the invention taken together with the accompanying examples and appended claims.

According to a first embodiment, there is provided a transceiver configured to be used in a satellite communications network and adapted to transmit/receive superframes having variable lengths, wherein at least one of the received superframes has standard payload capacity units (P) and dummy symbols (D).

The term "superframe" as used herein throughout the specification and claims is used to denote a physical layer frame structure, which has optional waveform container in accordance with Annex E of the DVB-S2X standard specification. The paper provides insights to capabilities of the SF structure in support of emerging system applications.

According to another embodiment of the present disclosure, in the case that the dwell time includes a plurality of superframes, the receiver is configured to be synchronized to a received signal.

In accordance with another embodiment, in case that more than one symbol rate is used in the system, and the dwell time (i.e. hop time) and the switching time are predetermined, a processor comprised in the transceiver is configured to calculate the values of the P and D parameters according to the symbol rate associated therewith.

By yet another embodiment, the values of the parameters P and D are calculated by the processor in accordance with the following relationships:

$$P = \left\lfloor \frac{(\text{hop time} - \text{switching time}) * (\text{symbol rate}) - \text{header length}}{CU \text{ size}} \right\rfloor$$

$$D = (\text{hop time}) * (\text{symbol rate}) - (\text{header length}) - (CU \text{ size}) * P$$

wherein CU is the number of symbols in each Capacity Unit.

According to another embodiment, the received signal is a multi-carrier signal having different symbol rates per carrier.

In accordance with still another embodiment, the transceiver is configured to embed regular DVB-S2/S2X frames within a flexible superframe.

By yet another embodiment, the transceiver is configured to enable splitting a regular frame between two or more superframes.

According to another embodiment, the transceiver is configured to transmit a header defined by the DVB-S2X Annex E, format 4 Communication Standard, following the P payload data symbols.

By still another embodiment the transceiver is further configured to turn off the transmitter once the header of the superframe has been transmitted.

According to another aspect of the present disclosure there is provided a transceiver configured to be used in a satellite communications network and adapted to transmit/receive variable length superframes, wherein the end of each variable length superframe is indicated by using a dummy frame header (used as a postamble).

In accordance with another embodiment of this aspect of the disclosure, a processor comprised in the receiver is not provided with a-priori values of the parameters P and D, and wherein the processor is configured to identify the end of the superframe by receiving a type B dummy frame header.

In accordance with another aspect of the present disclosure there is provided a transceiver configured to be used in a satellite communications network and adapted to transmit/ receive superframes having variable lengths, wherein the transceiver operates while using a flexible hop duration, and wherein the flexible hop duration is indicated by a SOH and ends with an EOH preamble and postamble.

By yet another embodiment, there is provided a transceiver configured to be used in a satellite communications network and adapted to transmit/receive superframes having variable lengths, wherein the end of each of these superframes having variable lengths is indicated by using a known sequence of symbols, as a postamble.

In accordance with still another embodiment, there is provided a transceiver configured to be used in a satellite communications network and adapted to transmit/receive superframes having variable lengths, wherein the transceiver is configured to operate while using a flexible hop duration, and wherein the flexible hop duration is indicated by a SOH and ends with an EOH preamble and postamble.

According to another aspect of the disclosure, a method is provided for use in a satellite communications network, wherein the method comprises transmitting/receiving superframes having variable lengths, and wherein at least one of the received superframes has standard payload capacity units (P) and dummy symbols (D).

By yet another embodiment of this aspect, the method further comprising a step of beam hopping, wherein hopping times are not known in advance to a receiver comprised in the satellite communications network to which traffic is being conveyed, since dwell times applied are variable dwell times.

According to still another embodiment, at a start of a hop, a synchronization preamble is transmitted, followed by a sequence of regular DVB-S2X PLFRAMEs and ending with a postamble, indicating the end of hop, and wherein the number and types of PLFRAMES may vary from hop to hop according to actual communications traffic being conveyed and according to types of terminals located within an illuminated cell.

BRIEF DESCRIPTION OF THE DRAWINGS

For a more complete understanding of the present invention, reference is now made to the following detailed description taken in conjunction with the accompanying drawings wherein:

FIG. 1—illustrates a prior art structure of a format 4 DVB-S2X Annex E superframe;

FIG. 2—presents an example of a modified size superframe construed in accordance with an embodiment of the present invention; and FIG. 3—presents another example of a modified DVB-S2X waveform for beam hopping, construed in accordance with another embodiment of the invention.

DETAILED DESCRIPTION OF PREFERRED EMBODIMENTS

In the following description, for the purposes of explanation, numerous specific details are set forth in order to provide a better understanding of the present invention by way of examples. It should be apparent, however, that the present invention may be practiced without these specific details.

Following are two examples of waveforms construed in accordance with embodiments of the present invention.

Example 1—Pre-Scheduled Schemes, Traffic Driven Scheme in a Grid-Based Mode

FIG. 2 shows a suggested frame structure for a waveform, one which is applicable in a case where communications are transmitted in a predictable manner, such as in a pre-scheduled scheme or in a grid-based traffic driven scheme.

One of the main differences that exist between such a waveform and the one presented in FIG. 1 (i.e. the prior art structure) is the flexible setting of the values of the parameters P and D, which are defined as follows:

P≥0, is an integer, defining the number of payload CU's comprised in the superframe;

D≥0 is an integer, determining the number of postamble symbols that are present at the end of the superframe.

The values of parameters P and D are preferably system configurable, allowing in case that the dwell time includes a plurality of superframes, to easily synchronize the receiver to the received signal.

It should be noted that although the header shown in FIG. 2 is the same header as defined in prior art solutions, it should be clear that any other applicable different structure of a header can be used instead of that header.

When more than one symbol rate is used in a system, such as in a case of a multi-carrier having different symbol rates per carrier, and the dwell time (hop time) and the switching time are set for the system, then each terminal calculates P and D according to its symbol rate.

$$P = \left\lfloor \frac{(\text{hop time} - \text{switching time}) * (\text{symbol rate}) - \text{header length}}{CU \text{ size}} \right\rfloor$$

$$D = (\text{hop time}) * (\text{symbol rate}) - (\text{header length}) - (CU \text{ size}) * P$$

For example, if the hopping time and the switching time are 1 msec and 2 μsec respectively, and the symbol rates of two carriers are 50M symbols per sec and 100M symbols per sec, the value of P would be: 538 and 1092, respectively, while the values for D would be 140 and 280, respectively.

This structure allows for:

Embedding regular DVB-S2/S2X frames within a flexible superframe; and

Splitting a regular frame between superframes, using the mechanism implemented in the superframe format 4 definition.

Embedding a header (defined in the DVB-S2X Annex E, format 4, standard as a 180 symbols dummy frame header), which can be transmitted following the P payload data symbols which indicate the end of the superframe.

Another embodiment of the scheme, enables avoiding transmission of dummy symbols at the end of the superframe, except, for the header. Namely, turning the transmitter off once the header has been transmitted, as described in our co-pending patent application published under US 2017/0104520. By implementing such an option, interference to other cells is reduced and transmission power is saved.

According to this embodiment of the present invention, the processor comprised in the receiver does not require to be a-priory provided with the values of the parameters P and D. In fact, a superframe can be longer than 612542 symbols, if needed. According to this embodiment, the processor of the receiver is configured to deduce where is the end of the superframe by receiving the type B dummy frame header. In this case, this header should be mandatory per superframe transmission. On the other hand, relying on the dummy header alone, might increase the probability of synchronization loss.

Traffic Driven Schemes

FIG. 3 describes a suggested structure for an embodiment construed in accordance with the present invention, when the hopping times are not known in advance to the receiver's processor and are of variable dwell times.

The structure illustrated in FIG. 3 of a modified DVB-S2X waveform for beam hopping includes, at the start of a hop, a synchronization preamble, followed by a sequence of regular DVB-S2X PLFRAMEs and ending with a post-amble, indicating the end of hop. The number and types of PLFRAMES can vary from hop to hop according to the actual traffic and the type of terminals located in the illuminated cell.

In an embodiment of the invention, for acceptable SNR levels, the additional SOH (ExSOH) is 180-270 symbols long for a good autocorrelation sequence under low SNR conditions, the EOH can be a PLHEADER of 90-900 symbols long (with a predetermined PL signaling). This example of waveform may be applicable for both the free running mode as well as the grid-based mode.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features.

Variations of embodiments of the present disclosure described herein and embodiments of the present disclosure comprising different combinations of features noted in these embodiments will occur to persons of the art. The scope of the invention is limited only by the following claims.

The invention claimed is:

1. A method for use in a satellite communications network, comprising:
    transmitting and/or receiving superframes according to a pre-scheduled beam hopping time plan having different dwell times of cells of a plurality of cells within said satellite communications network,
    which superframes comprise payload capacity units and dummy symbols and have variable lengths, as defined by a number of payload capacity units (P) in a superframe,
    wherein the method comprises determining:
        said number of payload capacity units (P) according to a dwell time for transmission of said superframe and according to a beam switching time;
        a number of dummy symbols (D), according to said beam switching time by multiplying said beam switching time by said symbol rate, according to the following relationship equation:

$D=$(said dwell time)*(said symbol rate)−(said header length)−(said capacity unit size)*said number of payload units ($P$).

2. The method according to claim 1, wherein said determining is according to a symbol rate.

3. The method according to claim 1, comprising receiving a multi-carrier signal having different symbol rates per carrier;
    wherein said determining, for each carrier, comprises determining said payload capacity units (P) according to a symbol rate of said carrier.

4. The method according to claim 1, wherein said determining comprises determining said number of payload capacity units (P), according to the following relationship:

$P=$[((said dwell time−said beam switching time)* (said symbol rate)−a header length)/(a capacity unit size)].

5. The method according to claim 1, wherein said transmitting comprises embedding regular DVB-S2/S2X frames within said superframe.

6. The method according to claim 1, wherein said transmitting comprises splitting a regular frame between two or more of said superframes.

7. The method according to claim 1, wherein said dummy symbols comprise a dummy symbol header.

8. The method according to claim 7, wherein said dummy symbol header is as defined in the DVB-S2X Annex E, format 4, 5, 6, or 7 Communication Standard.

9. The method according to claim 7, wherein said transmitting is by a transmitter;
    wherein said method comprises turning off said transmitter once said dummy symbol header has been transmitted.

10. The method according to claim 1, comprising receiving said superframe,
    wherein said receiving comprises identifying an end of said superframe by recognizing a dummy frame header.

11. The method according to claim 1, further comprising a step of beam hopping, wherein said receiving is by a receiver of said satellite communications network, wherein said dwell time is not known in advance to said receiver.

12. The method according to claim 1, wherein said superframe comprises a synchronization preamble, followed by a said payload capacity units and ending with a postamble.

13. The method according to claim 12, wherein said synchronization preamble includes a SOH header, and wherein said postamble is an EOH postamble.

14. The method according to claim 12, wherein said payload capacity units are in a form of DVB-S2X PLFRAMEs wherein said determining comprises determining a number and type of PLFRAMES according to communications traffic being conveyed, and according to types of terminals located within an illuminated cell of said plurality of cells.

15. A transceiver for a satellite communications network having a plurality of cells employing a pre-scheduled beam hopping time plan having different dwell times for cells of the plurality of cells, which transceiver is configured to:
    transmit and/or receive superframes comprising payload capacity units and dummy symbols and having variable lengths, by determining:
        a number of payload capacity units (P) in a superframe, according to a dwell time for transmission of said superframe and according to a beam switching time;
        a number of dummy symbols (D), according to said beam switching time by multiplying said beam switching time by said symbol rate, according to the following relationship equation:

$D=$(said dwell time)*(said symbol rate)−(said header length)−(said capacity unit size)*said number of payload units ($P$).

16. The transceiver according to claim 15, wherein said determining is according to a symbol rate.

17. The transceiver according to claim 15, wherein said transceiver is configured to receive a multi-carrier signal having different symbol rates per carrier;
    wherein said determining, for each carrier, comprises determining said payload capacity units (P) according to a symbol rate of said carrier.

18. The transceiver according to claim 15, wherein said determining comprises determining said number of payload capacity units (P), according to the following relationship:

$$P = \left\lfloor \frac{(\text{said dwell time} - \text{said beam switching time}) * (\text{said symbol rate}) - \text{a header length}}{\text{a capacity unit size}} \right\rfloor.$$

19. The transceiver according to claim 15, wherein said transceiver is configured embed regular DVB-S2/S2X frames within said superframe.

20. The transceiver according to claim 15, wherein said transceiver is configured to transmit superframes by splitting a regular frame between two or more of said superframes.

* * * * *